Nov. 28, 1950　　　　J. B. ATWOOD ET AL　　　　2,531,494
PULSE IDENTIFICATION

Filed May 5, 1945　　　　　　　　　　　　　　3 Sheets-Sheet 1

INVENTORS.
JOHN B. ATWOOD.
GRANT E. HANSELL.
BY H. S. Grover
ATTORNEY.

Fig. 3A. 1000 Cycle Modulation.
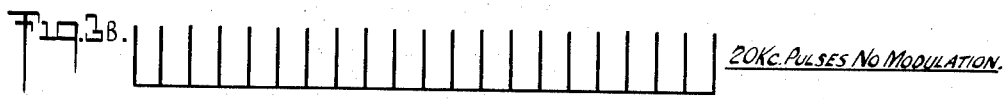
Fig. 3B. 20KC. Pulses No Modulation.
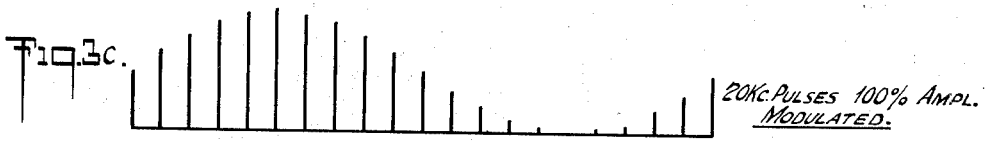
Fig. 3C. 20KC. Pulses 100% Ampl. Modulated.
Fig. 3D. 20KC. Pulses, Phase Modulated π Radians Deviation.
Fig. 3E. 20KC. Pulses, Freq. Modulated 10KC. Deviation.
Fig. 3F. 20KC Long Pulses No Modulation.
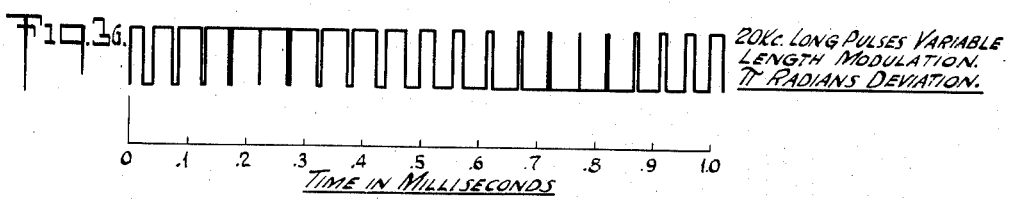
Fig. 3G. 20KC. Long Pulses Variable Length Modulation. π Radians Deviation.
Time in Milliseconds
INVENTORS.
JOHN B. ATWOOD
GRANT E. HANSELL
BY
ATTORNEY.

Nov. 28, 1950  J. B. ATWOOD ET AL  2,531,494
PULSE IDENTIFICATION

Filed May 5, 1945  3 Sheets-Sheet 3

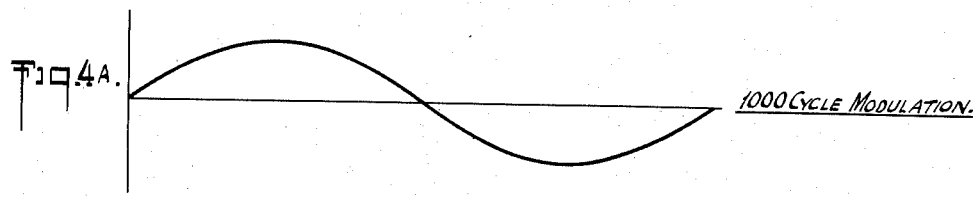
Fig.4A.  1000 Cycle Modulation.

Fig.4B.  Double Pulses, 10 Kc. Group Rate - No Modulation.

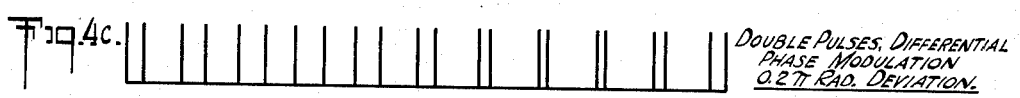
Fig.4C.  Double Pulses, Differential Phase Modulation 0.2π Rad. Deviation.

Fig.4D.  Short Pulses, 10 Kc. Group Rate - No Modulation.

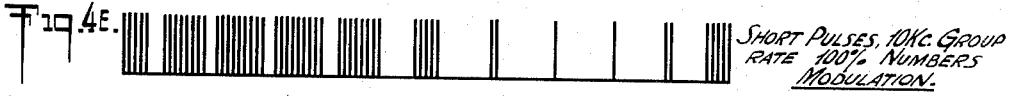
Fig.4E.  Short Pulses, 10 Kc. Group Rate 100% Numbers Modulation.

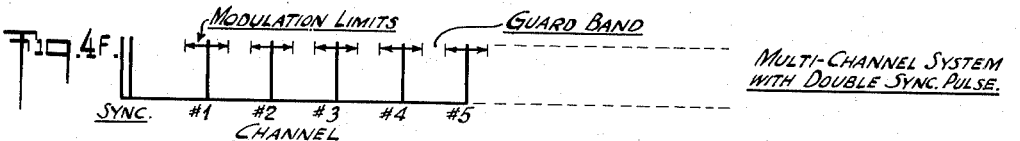
Fig.4F.  Multi-Channel System with Double Sync. Pulse.

Fig.4G.  Multi-Channel System with Long Sync. Pulse.

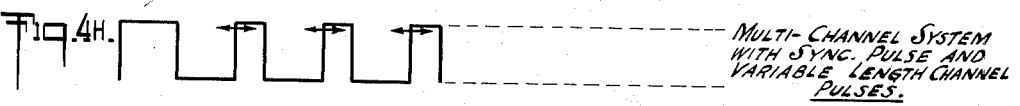
Fig.4H.  Multi-Channel System with Sync. Pulse and Variable Length Channel Pulses.

Fig.4J.

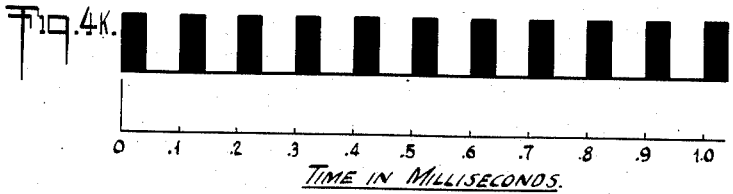
Fig.4K.

Time in Milliseconds.

INVENTORS.
JOHN B. ATWOOD.
GRANT E. HANSELL.
BY
ATTORNEY.

Patented Nov. 28, 1950

2,531,494

UNITED STATES PATENT OFFICE 2,531,494

PULSE IDENTIFICATION

John B. Atwood and Grant E. Hansell, Riverhead, N. Y., assignors to Radio Corporation of America, a corporation of Delaware Application May 5, 1945, Serial No. 592,090

13 Claims. (Cl. 250—17)

This invention relates to a method of and apparatus for identifying pulse communication systems, and more particularly to a method of obtaining such primary information as the average pulse rate, the pulse length and the type of modulation employed in a pulse communication system.

The present invention enables the detection of unknown radio signals and permits a determination of whether or not the signal is a pulse communication signal; and, if so, the obtaining of information as to the average pulse rate, the pulse length and the type of modulation. After this information has been learned by means of the invention, it is a comparatively simple matter to construct a receiver especially adapted to monitor the particular signal being received.

The following is a description of the invention accompanied by drawings, wherein:

Fig. 1 is a block diagram of the apparatus utilized in the present invention to identify the type of pulse communication being used on the unknown signals which are received;

Fig. 2 schematically illustrates details of the circuit arrangements of the detector and audio amplifier units of Fig. 1; and Figs. 3a to 3g and Figs. 4a to 4k are curves given to graphically illustrate the operation of the present invention during the process of identification.

Referring to Fig. 1, the identification apparatus shown therein includes a receiving antenna 10 which feeds the received signals via a lead 11 to a pulse receiver 1. The receiver 1 is of the superheterodyne type and is suitable for pulse reception. By way of example, the intermediate frequency amplifier stage of this receiver may have an equivalent band width of about three megacycles for receiving pulses having lengths (time duration) now commonly known in the art; let us say, for example, in the range of one-half a microsecond to 100 microseconds. If the incoming signals constitute extremely short pulses, let us say below .1 microsecond, then obviously the receiver should have a sufficiently wide band width to accommodate these short signals, in which case the intermediate frequency amplifier stage should have a band width wider than three megacycles. In view of the fact that the received pulse rates may vary over an approximate range of 10 kilocycles to 100 kilocycles for voice communication, and the pulse may be either long or short, it is preferred that the receiver be equipped with an automatic gain control (AGC) circuit which is adjustable. This AGC circuit thus enables an adjustment to be made so that a reasonably constant output can be obtained for any particular signal. If an "on"—"off" keying is employed for modulation purposes on the signal being received, the received pulse rate may be as low as one kilocycle, and even lower.

The output of the receiver 1 is in the form of direct current (sometime referred to as video) pulses which are supplied to a cathode follower 2 in order to obtain therefrom a low impedance output. Cathode follower 2 supplies output pulses of direct current and of positive polarity to leads 7 and 8, and these output pulses have a peak amplitude which, for the particular circuit arrangement shown in Fig. 2, should not exceed 20 volts. This 20 volts limitation, it should be understood, is required because of the particular type of vacuum tubes employed in Fig. 2, although it should be understood that other peak amplitudes are suitable for other types of tubes. The direct current pulses which are supplied to lead 7 are transmitted over this lead to an oscilloscope unit 4 for visual observation. The same direct current output pulses from the cathode follower 2 are fed over lead 8 through an R.-C. circuit to a detector 3 whose output is coupled to an audio amplifier 6 for aural observation in an electro-acoustic transducer such as headphones 9 or a loudspeaker. The detector 3 is arranged to operate on any type of pulse modulation impressed thereon from lead 8 and enables a determination of the basic characteristics of the particular transmission used on the incoming signals. The audio amplifier 6 informs the operator of the particular language employed on the pulses if voice modulation is used. Because of this arrangement, there is obtained a combination of visual and aural observation to aid the operator in obtaining the primary information desired about the incoming signal.

Oscilloscope unit 4 is of the type well known in the art and includes a cathode ray tube upon whose fluorescent screen the visual observations are indicated, individual amplifiers for the vertical and horizontal deflection elements of the cathode ray tube, a variable saw-tooth generator capable of providing sweep rates from about five cycles up to thirty kilocycles for supplying the horizontal trace across the screen of the cathode ray tube, equipment for blanking the return trace of the saw-tooth sweep, and means for triggering off a high speed horizontal sweep generator by the incoming pulses. The vertical deflection amplifier should have a flat frequency response up to at least 1.5 megacycles. The high speed horizontal sweep generator should be calibrated for sweep durations of about ten microseconds (corresponding to 100 kilocycles) and 100 microseconds, in order to measure the time it takes the forward trace of the sweep to travel over the screen of the tube. This last feature is necessary in order to measure the pulse lengths or durations of the incoming pulses seen on the screen of the cathode ray tube. The triggering feature enables the starting time of the high speed sweep generator to be controlled by the introduction of the incoming pulses to be examined so as to synchronize the starting time of the high speed sweep generator to the starting time of one of the incoming pulses. Such an oscilloscope unit is well known in the art and is commercially available.

As is well known, a triggered sweep does not sweep across the fluorescent screen of the oscilloscope tube until released by a pulse. The sweep then passes once across the screen, snaps back and remains at its original position until triggered or released again by the next pulse which comes along after it it has restored itself to rest.

An oscillator 5 is arranged so that it can be connected by means of a switch S to the detector 3 and is used for determining the average pulse rate of the received signals. For example, for a three kilocycle (3 kc.) audio band width, assuming that the incoming pulses are used in a voice modulation system, the lowest pulse rate that can be used for the incoming signals is about 9 kilocycles. The highest pulse rate which would be encountered on the incoming signals would be in a multi-channel or variable numbers (for example pulse number modulation) system and would probably be on the order of 100 kilocycles. For this reason, a minimum frequency range for the oscillator of about 8 kilocycles to 100 kilocycles would be necessary for receiving pulses having voice modulation impressed thereon. However, in order to cover all present contemplated possibilities, the frequency range of the oscillator 5 is made to be about zero to 250 kilocycles. The oscillator 5 is also provided in its output with a suitable voltmeter and an attenuator circuit to permit measurement of the level of oscillations generated by the oscillator.

Fig. 2 shows the circuit details of the detector 3 and the audio amplified 6. Detector 3 is a pentagrid tube of the RCA 6SA7 type, while the audio amplifier 6 comprises two vacuum tube stages, one an RCA 6SJ7 tube and the other an RCA 6J5 tube. Obviously, other types of tubes can also be used for these units and will achieve the results of the invention.

The positive pulses from the cathode follower 2 are fed via lead 8 to the first grid G1 of the detector 3 through an R.-C. circuit which has a sloping frequency response. It is this sloping response characteristic of the R.-C. circuit which produces an amplitude variation from a phase or frequency modulated input signal applied to lead 8. The resulting amplitude variation is amplified by the audio amplifier 6 which follows the detector.

The pulses applied to lead 8 are fed to grid G1 because this particular grid is more suitable for the particular ranges of pulse amplitudes encountered in use than any other grid of the 6SA7 tube. The audio output with this arrangement is very nearly linear with pulse amplitude over a range of peak pulse amplitudes at the input to the R.-C. circuit from one to 20 volts.

The oscillator 5, which covers a frequency range of about zero to 250 kilocycles, is connected to to the third grid G3 of the detector when the switch S is closed. During the operation of the system, when the frequency of the oscillator 5 is adjusted to be nearly the same as the average pulse rate of the received signal, an audio beat note will be heard in the headphones 9. If the frequency of the oscillator 5 is then varied to the zero beat condition (that is, the condition where the frequency of the oscillator is equal to the pulse rate of the incoming signals), the average pulse rate can then be read from the calibration dial of the oscillator 5. There are certain simple precautions to be observed when this procedure is followed and they are explained later in connection with the description of the actual identification process.

Since the oscillator 5 feeds into the grid G3 of the 6SA7 detector tube 3, the amplitudes of the oscillations should be kept low to prevent the generation of harmonics of the oscillator frequency, as this would produce spurious notes with the incoming signal. In the particular system illustrated, the output of the oscillator 5 should be about 35 decibels below one volt r. m. s., if four volt peak incoming pulses are applied to the R.-C. circuit; and about 50 decibels below one volt r. m. s., if twenty volt peak pulses are used.

The audio gain from the anode of the detector to the 500 ohm output of the audio amplifier 6 should be about 40 decibels, if a peak pulse amplitude of four volts is applied to the R.-C. circuit and pulses from a single channel system are being received. The amplifier 6 shown in Fig. 2 is provided with additional gain to allow for the reduced output obtained from multi-channel systems.

Signal identification

The operation of the invention will now be described: Let it be assumed that the incoming signal is an amplitude modulated continuous wave signal, then the operator must first find out whether the incoming signal is a pulse communication signal or a continuous wave signal with the foregoing assumption, the modulation will be heard on the headphones 9 and the modulation frequencies will be observed on the oscilloscope unit 4. During pauses in the modulation (that is, during the intervals when there is a carrier but no modulation impressed thereon), there will be seen on the screen of the cathode ray tube only the horizontal sweep line. Obviously, no pulses will be observed under this assumption because there aren't any pulses being received.

Let it now be assumed that the incoming signal is a phase or frequency modulated continuous wave signal. For this assumption the modulation can be heard in the headphones 9 by detuning the superheterodyne receiver 1 slightly and using the sloping sides of the intermediate frequency (I. F.) amplifier frequency response curve to convert the incoming phase or frequency modulated signal to amplitude modulation. Although this conversion will not be perfect, it is sufficient for the operator to hear on the headphones the modulation on the signals. Again, the modulation frequencies will be seen on the oscilloscope and no pulses will be seen. During the intervals when there is no modulation, but only a carrier, there will be a horizontal sweep line on the screen of the cathode ray tube in the oscilloscope unit 4.

Let it now be assumed that pulse communication is used on the incoming signals. With this condition, the modulation will be heard in the headphones 9 and the pulses will be seen in varying positions on the oscilloscope unit. During pauses in the modulation, the pulses will remain stationary on the cathode ray screen provided the oscilloscope unit is adjusted properly. Ordinarily the oscilloscope will not be adjusted for the proper sweep rate when the signal is first seen and heard. However, there are two ways of telling that it is a pulse signal and not continuous waves (CW). For CW, only the horizontal sweep line will be seen on the screen of the cathode ray tube during pauses in the modulation because the continuous wave carrier is removed in the last detector of the receiver; while for pulses, a rectangular band will be seen on the cathode ray tube screen because at this time the sweep rate of the saw-tooth generator is not correlated to the incoming pulse rate. With the exception of pulse amplitude modulation, this rectangular band seen on the oscilloscope screen will not change in amplitude with modulation (for example, phase or frequency modulation of the pulses).

Another way of determining whether the incoming signal is pulse communication or continuous wave communication is to connect the oscillator 5 to the detector 3 by closing the switch S. Now, if the oscillator frequency is varied, a frequency will be found where a beat note is produced and heard in the earphones if pulses are being used, and none will be found for CW because the carrier of the CW never reaches the detector 3 since it is removed in the output of the receiver 1. This beat note should go through "zero beat" when the oscillator frequency passes through the frequency of the average pulse rate. The oscillator frequency should always be varied from the low frequency end of the range toward the high frequency end of the range and stop at the first zero beat. If this procedure is reversed, the oscillator will beat with the unavoidable harmonics of the pulse rate and an incorrect reading may be obtained for the pulse rate. Both processes of determining whether continuous wave or pulse communication is being used should preferably be employed as a check on one another.

The procedure for identifying the pulse signal is as follows: The oscillator 5 is connected to the detector 3 by closing the switch S and the pulse rate of the received pulses determined by varying the frequency of the oscillator 3 from zero upward until there is zero beat and then reading the frequency on the oscillator. By knowing the incoming pulse rate, the operator then knows substantially to what frequency or rate to adjust the saw-tooth sweep generator in the oscilloscope unit 4. The horizontal sweep rate of the oscilloscope unit 4 is varied until a stationary pattern of pulse is obtained when no modulation is present. Typical patterns will be described later in connection with Figs. 3a to 3g and 4a to 4g.

It has been found that with some oscilloscope units the horizontal sweep generator will synchronize with pulses better if it is connected in the "external sync." position, and the "external sync." connected to the input of the vertical deflection amplifier. It is desirable to start varying the horizontal sweep rate from the low frequency end as in the case of the oscillator. Aside from providing a uniform method of equipment operation, such a procedure avoids the possible difficulty which can happen with a multi-channel system, and that is to have the horizontal sweep rate too fast. By following the foregoing procedures, the operator has determined: first, whether the received signals emanate from a pulse communication system; and secondly, if so, the pulse rate of the received signals.

If, now, it is desired to measure the pulse length, assuming that the incoming signals are from a pulse communication system, the operator should make use of the triggered horizontal sweep feature of the oscilloscope unit 4 which has been calibrated as to sweep time. If this is used, the pulse length can be measured on the oscilloscope screen. By way of example, this pulse length may be anywhere from one-half microsecond to 100 microseconds. In what follows, several different typical pulse modulation systems and the manner in which the primary information can be derived from them in accordance with the invention, will be described.

*Pulse amplitude modulation*

One typical pulse system is known as the pulse amplitude modulation system in which the amplitude of the pulse is varied in accordance with the applied modulation. Fig. 3b shows a series of unmodulated short pulses occurring at a 20 kilocycle rate. Fig. 3c shows these pulses amplitude modulated 100% with the 1000 cycle sine wave of Fig. 3a. This type of modulation is easily recognized since the pulse spacing does not vary with modulation while the amplitudes of the pulses do vary with modulation, and this is seen on the screen of the oscilloscope. With the horizontal sweep of the oscilloscope synchronized to a sub-multiple of the pulse rate, in order to view more than one pulse on the screen of the oscilloscope, the pattern on the oscilloscope will appear similar to Fig. 3b with no modulation. Since we can determine the pulse rate from the procedure described previously, we can set the sweep rate at a sub-multiple of the pulse rate. When the signal is modulated, the amplitude of the pulses will vary but the individual pulses will always stand out clearly since there is no horizontal movement. When the oscillator is connected to the detector through switch S and the frequency varied from the low frequency end, the first zero beat will be the pulse rate. The pulse length (width) is obtained by using the calibrated triggered sweep on the oscilloscope and measuring the pulse length on the screen. More particularly, if the forward trace of the sweep is made to be 10μ seconds long and this covers the entire screen, the length of the pulse on the screen can be easily measured relative to the length of the forward trace and from this we determine the time duration of the pulse.

*Pulse phase modulation*

Another typical pulse system is known as a pulse phase modulation system in which the phase of the pulses is advanced and retarded from the position they would occupy if there were no modulation. This is illustrated by comparing Figs. 3b and 3d. Fig. 3b shows a series of unmodulated short pulses occurring at a 20 kilocycle rate, and Fig. 3d shows these pulses phase modulated with the 1000 cycle sine wave of Fig. 3a. The deviation illustrated is π radians. The pulses are advanced in phase on one half of the modulation cycle (for example, the positive half) and retarded on the other half (for example, the negative half), the amount of the phase shift being proportional to the amplitude of the modulation. The pulse amplitude remains constant. With the horizontal sweep of the oscilloscope synchronized to a sub-multiple of the pulse rate, the pattern on the oscilloscope will appear similar to Fig. 3B with no modulation. When the signal is modulated, a rectangular band like Fig. 4j will be seen for full modulation and the individual pulses cannot be seen. If less than full modulation is used, the pattern may appear as if the individual pulses had been widened into rectangles and would look somewhat like Fig. 4k. The pulse rate and length are determined in the same manner as for the pulse amplitude modulation.

Pulse frequency modulation

Still another typical pulse system is known by the term "pulse frequency modulation" in which the pulse rate is proportional to the amplitude of the modulation. This is illustrated by comparing Figs. 3b and 3e. Fig. 3B shows a series of unmodulated short pulses occurring at a 20 kilocycle rate, as seen on the oscilloscope screen, whereas Fig. 3E shows these pulses frequency modulated with the 1000 cycle sine wave of Fig. 3A. The showing of Fig. 3E does not, however, appear on the oscilloscope screen. The deviation illustrated is 10 kilocycles and in this case the pulse rate is increased to 30 kilocycles on the peak of the positive half cycle of the modulation and decreased to 10 kilocycles on the peak of the negative half cycle. The average pulse rate remains at 20 kilocycles. The pattern on the oscilloscope will appear similar to Fig. 3B with no modulation and will appear on the oscilloscope screen as a rectangular band (like Fig. 4J) when modulation is present. No practical method has been found with the apparatus of the invention for telling the difference between phase and frequency modulation. The pulse rate and length are determined in the same manner as for pulse amplitude modulation. At this time it should be noted that a showing like that of Fig. 4K on the oscilloscope screen may indicate frequency modulation of the pulses with a very low deviation.

Variable length modulation

In the pulse length modulation system, the length (that is, the width or time duration) of the pulse is proportional to the amplitude of the modulation. This is illustrated by comparing Figs. 3F and 3G. Fig. 3F shows a series of unmodulated long pulses occurring at a 20 kilocycle rate and Fig. 3G shows these pulses modulated with the 1000 cycle sine wave of Fig. 3A. In this illustration, the left hand edge is the one which is modulated and the width of the pulse is increased on the positive half cycle of the modulation and decreased on the negative half. The right hand edge is constant in position. Obviously, in the alternative, the right hand edge could be modulated while the left hand edge could be held constant. With the horizontal sweep of the oscilloscope synchronized to a sub-multiple of the pulse rate, the pattern on the oscilloscope will appear similar to Fig. 3F with no modulation. With modulation, the pattern will appear either as a rectangular band like Fig. 4J, or as a series of rectangles somewhat like Fig. 4K. Which pattern will appear will depend upon the percentage modulation. The pulse rate is determined in the same manner as for pulse amplitude modulation. The pulse length is determined in the same manner as for pulse amplitude modulation except that it must be determined when no modulation is present and preferably the slow triggered sweep rate should be used instead of the fast one, because the pulses are now much longer than those for other types of modulation.

Differential phase modulation

In another type of pulse modulation system, known as differential phase modulation, there are transmitted groups of pulses having two pulses per group. In the unmodulated condition, these will appear on the oscilloscope as in Fig. 4B, when the horizontal sweep is locked to a sub-multiple of the group rate. When modulation is applied, both pulses of a group are differentially displaced in phase from the unmodulated relationship by an amount proportional to the amplitude of the applied modulation. This is illustrated in Fig. 4C where the spacing is increased on the positive half cycle of the 1000 cycle modulation of Fig. 4A and is decreased on the negative half cycle. The pattern on the oscilloscope will then appear as a series of rectangles somewhat like that shown in Fig. 4K for maximum modulation, except that this figure is not drawn to scale for this particular condition because each pulse can swing in or out a maximum amount of one-half the unmodulated spacing. The pulse length is determined in the same manner as for pulse amplitude modulation, and the spacing between the two pulses of a group can also be determined when no modulation is present by using the triggered sweep. When the oscillator 5 is connected to the detector 3 and its frequency varied, the first zero beat obtained will be the group rate. Since the group rate is the important factor to be determined, this represents no change in the procedure of identification.

Pulse numbers modulation

In this type of pulse system, there are transmitted different numbers of pulses in accordance with the modulation. Fig. 4D shows the pulses for the unmodulated condition. In the example of Fig. 4D, groups of five pulses are transmitted at a 10 kilocycle group rate and the spacing between the individual pulses of a single group corresponds to a 100 kilocycle rate. In order to obtain the group rate, the oscillator 5 is varied from the low frequency end until there is obtained the first zero beat. This position corresponds to the frequency of the group rate. When modulation is applied, the number of pulses per group varies in accordance with the modulation. This is illustrated in Fig. 4E, where the number of pulses per group is increased on the positive half cycle of the 1000 cycle modulation of Fig. 4A, and is decreased on the negative half cycle. Since there is no variation in the spacing of the pulses with modulation, the individual pulses will always stand out clearly on the oscilloscope screen when the horizontal sweep is locked to a sub-multiple of the group rate and the pattern on the oscilloscope will change between Fig. 4D with no modulation, to a continuous series of individual pulses in the presence of modulation. The pulse length, the spacing between individual pulses, and the group rate are determined as for differential phase modulation.

Multi-channel systems

It is known to employ multi-channel pulse communication systems. The pulses from three typical multi-channel systems are illustrated in Figs. 4F, 4G and 4H as they may appear on the oscilloscope screen. The arrows on these pulses indicate the range of positions which these pulses may take with variations in modulation. The outstanding features of these systems from an identification standpoint are the use of a synchronizing signal and the fact that the channel pulses are phase modulated. This is illustrated by Fig. 4F which shows a double pulse synchronizing signal followed by five channel pulses. In an actual system, the number of pulses following the synchronizing signal will be equal to the number of channels and may vary from two to perhaps nine or ten. The pattern then repeats itself. The synchronizing signal is used to synchronize the channel separating equipment in the receiver and hence must have some characteristic to distinguish it from the channel pulses. In this case, it consists of two pulses close together. The individual channel pulses are phase modulated and the maximum deviation must be such as to leave a guard band (time interval) between adjacent channels so that they may be separated and also prevent cross talk from one channel to the next.

Fig. 4G shows a system which uses a long pulse for synchronization and is otherwise similar to Fig. 4F.

Fig. 4H shows a system which uses a long synchronizing pulse but variable length pulses for the channels.

Figure 1:
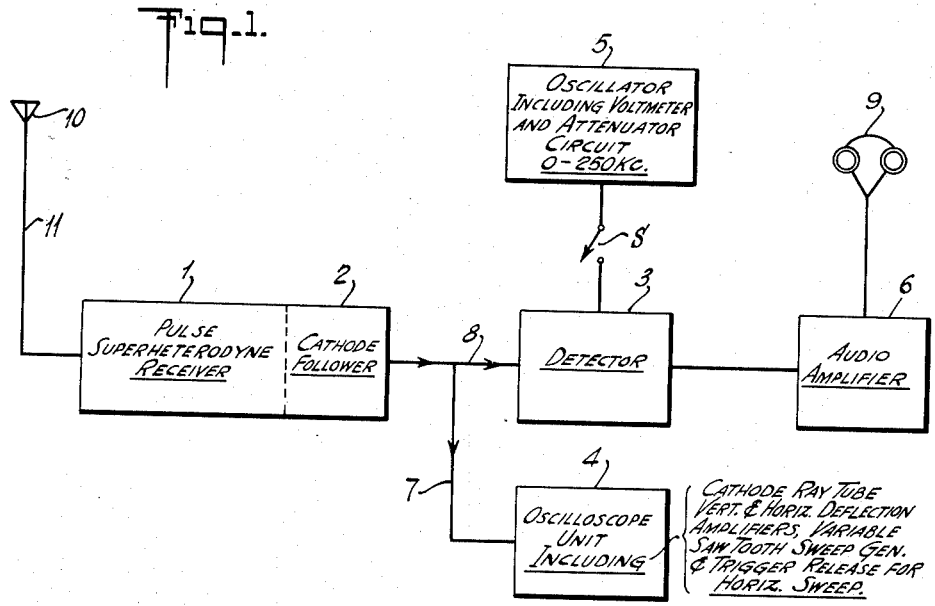
Figure 2:
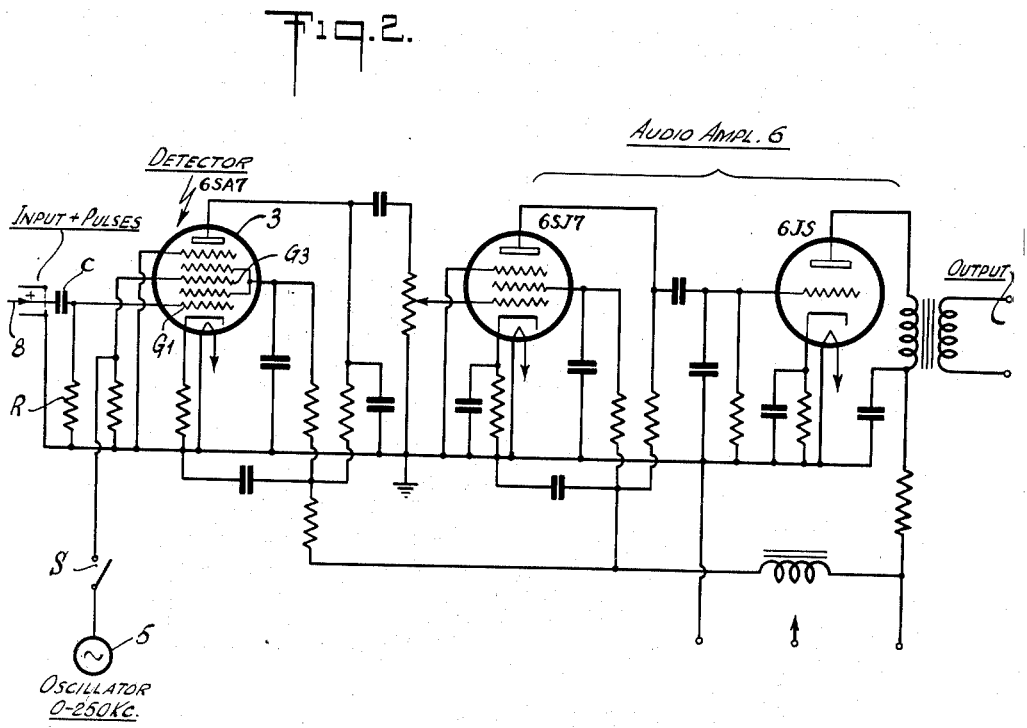

Multi-channel systems are easily identified as such due to the characteristic synchronizing pulse and the fact that if more than one channel is being modulated, the output of the audio amplifier will contain the modulation from the various channels superimposed on each other. However, trouble may be experienced in obtaining the information necessary to describe the system.

One difficulty may occur if the horizontal sweep of the oscilloscope is not synchronized to a submultiple of the group rate, where a group is defined as including a synchronizing pulse plus the channel pulses up to the next synchronizing pulse. If the oscilloscope is not synchronized properly, an incorrect pattern will appear on the sceen. A similar effect is obtained if the sweep rate is too fast. These difficulties can be overcome only by practice and familiarity with the equipment. However, due to the fact that a synchronizing pulse is transmitted, there will be a strong tendency for the oscilloscope sweep to lock-in properly, particularly at the lower sweep rates.

When the oscillator 5 is connected to the detector and its frequency varied, a zero beat will be obtained at the group rate due to the synchronizing pulse. This synchronizing pulse will be the lowest frequency rate put out by the pulse multiplex transmitter. This will be particularly true in the case of Fig. 4G. It is quite probable that the group rate will be the only information which can be obtained from the oscillator since the spacing between the synchronizing pulse and the channel pulses may be different than the spacing between the channel pulses. The channel pulses may have different spaces among themselves, and some channel pulses may be normally missing and used only for ringing, etc. The various possibilities and combinations are quite numerous. The number of channels is determinable from observing the oscilloscope screen and counting the number of pulses between two synchronizing signals. This number will correspond to the number of channels in the system, assuming, of course, that one channel pulse is not momentarily missing. A knowledge of the group rate, type of synchronizing and channel pulses, number of channels, and perhaps the pulse length should provide very desirable preliminary information. With the oscilloscope sweep locked properly, it is possible to estimate the channel and synchronizing pulse spacing fairly well.

What is claimed is:

1. The method of identifying the characteristics of recurring signal pulses of alternating current energy on the fluorescent screen of a cathode ray oscilloscope provided with a sweep generator producing sweep waves for said oscilloscope, which includes the steps of receiving the signal pulses, producing unidirectional current pulses from the received pulses, beating the unidirectional current pulses with locally produced oscillations, varying the frequency of the locally produced oscillations upwards from a frequency below the pulse rate of the received signals until the first zero beat condition occurs, to thereby determine the average pulse rate of the received pulses, applying said unidirectional current pulses to the deflection elements of said oscilloscope for visual observation on the fluorescent screen thereof, controlling the sweep waves produced by said generator from said unidirectional current pulses, and comparing the time duration of the pulses on the screen in relation to the time duration of the forward trace of the sweep wave.

2. The method of identifying the characteristics of recurring signal pulses of alternating current energy on the fluorescent screen of a cathode ray oscilloscope provided with a saw-tooth wave sweep generator producing sweep waves for said oscilloscope, which includes the steps of receiving the signal pulses, producing unidirectional current pulses from the received pulses, beating the unidirectional current pulses with locally produced oscillations, varying the frequency of the locally produced oscillations upwards from a frequency below the pulse rate of the received signals until the first zero beat condition occurs, to thereby determine the average pulse rate of the received pulses, applying said unidirectional current pulses to the deflection elements of said oscilloscope for visual observation on the fluorescent screen thereof, controlling the sweep waves produced by said generator from the unidirectional current pulses, and measuring the width of the pulses on the screen in relation to the calibrated sweep time of the saw-tooth wave produced by said sweep generator.

3. The method of identifying the characteristics or recurring signal pulses of radio frequency energy on the fluorescent screen of a cathode ray oscilloscope provided with an adjustable frequency sweep generator, which includes the steps of receiving the signal pulses, producing unidirectional current pulses from the received pulses, beating the unidirectional current pulses with locally produced oscillations, varying the frequency of the locally produced oscillations upwards from a frequency below the pulse rate of the received signals until the first zero beat condition occurs, to thereby determine the average pulse rate of the received pulses, applying said unidirectional current pulses to the deflection elements of said oscilloscope for visual observation on the fluorescent screen thereof, and adjusting the frequency of said sweep generator to correspond substantially to the average pulse rate of the received pulses and until a stationary pattern of pulses appears on said screen in the absence of modulation.

4. The method of identifying the characteristics of recurring signal pulses of radio frequency energy on the fluorescent screen of a cathode ray oscilloscope provided with an adjustable frequency sweep generator, which includes the steps of receiving the signal pulses, producing unidirectional current pulses from the received pulses, beating the unidirectional current pulses with locally produced oscillations, varying the frequency of the locally produced oscillations upwards from a frequency below the pulse rate of the received signals until the first zero beat condition occurs, to thereby determine the average pulse rate of the received pulses, applying said unidirectional current pulses to the deflection elements of said oscilloscope for visual observation on the fluorescent screen thereof, adjusting the frequency of said sweep generator to correspond substantially to the average pulse rate of the received pulses and until a stationary pattern of pulses appears on said screen in the absence of modulation, controlling the frequency of said sweep generator from the received pulses, and measuring the width of the pulses on the screen in relation to the calibrated sweep time of the sweep wave produced by said sweep generator.

5. The method of identifying the characteristics of recurring signal pulses of radio frequency energy on the fluorescent screen of a cathode ray oscilloscope provided with an adjustable frequency sweep generator, which includes the steps of receiving the signal pulses, producing unidirectional current pulses from the received pulses, beating the unidirectional current pulses with locally produced oscillations, varying the frequency of the locally produced oscillations upwards from a frequency below the pulse rate of the received signals until the first zero beat condition occurs, to thereby determine the average pulse rate of the received pulses, applying said unidirectional current pulses to the deflection elements of said oscilloscope for visual observation on the fluorescent screen thereof, and adjusting the frequency of said sweep generator to correspond to a sub-multiple of the pulse rate.

6. The method of identifying the characteristics of modulated signal pulses of alternating current energy by means of apparatus including an oscilloscope provided with a sweep generator, which includes the steps of receiving the signal pulses, producing direct current pulses of positive polarity from the received pulses, beating said direct current pulses with locally produced recurring waves to determine the average pulse rate of the received signal pulses, applying the direct current pulses to the deflection elements of said oscilloscope for visual observation thereon, controlling the sweep waves from said direct current pulses, and comparing only during the absence of modulation the time duration of the pulses as seen on the oscilloscope in relation to the time duration of the forward trace of the sweep wave.

7. The method of identifying characteristics of recurring groups of modulated signal pulses of radio frequency energy by means of apparatus including an oscilloscope provided with an adjustable frequency sweep generator, which includes the steps of receiving the signal pulses, producing unidirectional current pulses from the received pulses, beating the unidirectional current pulses with locally produced oscillations, varying the frequency of the locally produced oscillations upwards from a frequency below the pulse rate of the received signals until the first zero beat condition occurs, to thereby determine the group rate, applying said unidirectional current pulses to the deflection elements of said oscilloscope for visual observation on said oscilloscope, and adjusting the frequency of said sweep generator to correspond to said group rate.

8. Apparatus for use in identifying pulse signals, comprising a superheterodyne receiver suitable for pulse reception and having a circuit for converting the received pulses to direct current pulses of predetermined polarity, a multi-grid detector having an input grid coupled to the output of said receiver, an oscillator which is adjustable over a minimum frequency range of 8 kilocycles to 120 kilocycles, a connection from the output of said oscillator to another input grid of said detector, an audio frequency response circuit coupled to the output of said detector, an oscilloscope unit having the following circuit elements: a cathode ray tube having electron beam deflection elements, a sweep generator adjustable over a frequency range including a sub-audible frequency up to the highest audio frequency, means for controlling the sweep generator from said direct current pulses, and a circuit coupling certain electron beam deflection elements of said cathode ray tube to the output of said receiver.

9. Apparatus for use in identifying pulse signals comprising a superheterodyne receiver suitable for pulse reception, said receiver having an equivalent band width of approximately 3 megacycles for its intermediate frequency amplifier, said receiver also having a circuit following said intermediate frequency amplifier for converting the received pulse signals to direct current signals, a cathode follower coupled to the output of said receiver, a detector coupled to the output electrode of said cathode follower, an oscillator which is adjustable in frequency over a frequency range of about 0 to 250 kilocycles, a connection including a switch coupling said oscillator to said detector, an audio frequency amplifier coupled to the output of said detector, headphones or a loudspeaker coupled to the output of said audio frequency amplifier, and an oscilloscope unit having the following circuits: a cathode ray tube provided with a fluorescent screen and vertical and horizontal electron beam deflection elements, a saw-tooth wave sweep generator adjustable over a frequency range of substantially 5 cycles to 30 kilocycles, means for releasing said sweep generator in response to input pulses, means for blanking the return trace of the saw-tooth sweep wave, amplifiers for the vertical and horizontal deflection elements of said cathode ray tube, and a circuit coupling the vertical deflection elements to the output electrodes of said cathode follower.

10. Apparatus for use in identifying pulse signals, comprising a superheterodyne receiver suitable for pulse reception and having a circuit for supplying a unidirectional current output, a detector coupled to the output of said receiver, an oscillator which is adjustable in frequency over a minimum frequency range of 8 kilocycles to 120 kilocycles, a connection coupling said oscillator to said detector, an audio frequency indicator circuit coupled to the output of said detector, an oscilloscope unit also coupled to the output of said receiver, said oscilloscope unit including a cathode ray tube having a fluorescent screen and electron beam deflection electrodes, a sweep generator which is adjustable over substantially the entire audio frequency range, and a trigger release circuit for controlling said sweep generator from the pulses passed by said receiver.

11. Apparatus for use in identifying pulse signals, comprising a superheterodyne receiver suitable for pulse reception and having a circuit for converting the received pulses to a unidirectional current output, a detector coupled to the output of said receiver, an oscillator which is adjustable in frequency over a minimum frequency range of 8 kilocycles to 120 kilocycles, a connection coupling said oscillator to said detector, an audio frequency indicator circuit coupled to the output of said detector, means for effectively disassociating said oscillator from said audio frequency indicator circuit, an oscilloscope unit also coupled to the output of said receiver, said oscilloscope unit including a cathode ray tube having a fluorescent screen and electron beam deflection electrodes, a sweep generator which is adjustable over substantially the entire audio frequency range, and a trigger release circuit for controlling said sweep generator from the pulses passed by said receiver.

12. Apparatus for use in identifying pulse signals, comprising a superheterodyne receiver suitable for pulse reception and having a circuit for supplying a unidirectional current output, a detector coupled to the output of said receiver, an oscillator which is adjustable in frequency over a minimum frequency range of 8 kilocycles to 120 kilocycles, said oscillator including a voltmeter and an attenuator circuit for measuring the output level of the produced oscillations, a connection coupling said oscillator to said detector, an audio frequency indicator circuit coupled to the output of said detector, means for effectively disassociating said oscillator from said audio frequency indicator circuit, an oscilloscope unit also coupled to the output of said receiver, said oscilloscope unit including a cathode ray tube having a fluorescent screen and electron beam deflection electrodes, a sweep generator which is adjustable over a range substantially from 5 cycles to 30 kilocycles, and a trigger release circuit for controlling said sweep generator from the pulses passed by said receiver.

13. Apparatus for use in identifying pulse signals, comprising a superheterodyne receiver suitable for pulse reception and having a circuit for supplying a unidirectional current output, a multi-grid detector having an input grid electrode coupled to the receiver output, an oscilloscope unit having certain deflection plates coupled to said output from the receiver, an adjustable frequency oscillator, a connection including a switch from the output of said oscillator to another grid electrode of said multi-grid detector, an audio amplifier coupled to the output of said detector, an electro-acoustic transducer in the output of said audio amplifier, said oscilloscope unit including a sweep generator which is adjustable over a range substantially from 5 cycles to 30 kilocycles.

JOHN B. ATWOOD.
GRANT E. HANSELL.

REFERENCES CITED

The following references are of record in the file of this patent:

UNITED STATES PATENTS

| Number | Name | Date |
|---|---|---|
| 2,269,126 | Pieracci | Jan. 6, 1942 |
| 2,284,219 | Loughren | May 26, 1942 |
| 2,321,315 | Peterson et al. | June 8, 1943 |
| 2,323,534 | Goddard | July 6, 1943 |
| 2,355,363 | Christaldi | Aug. 8, 1944 |
| 2,358,028 | Peterson | Sept. 12, 1944 |

OTHER REFERENCES

Oscilloscope for Pulse Studies, Atwood and Owen, Electronics, December 1944, pages 110 to 114.

Electronics, January 1946, page 95, published by McGraw-Hill Co., New York City.